United States Patent
Kumar et al.

[11] Patent Number: 5,809,221
[45] Date of Patent: Sep. 15, 1998

[54] APPARATUS AND METHOD FOR DETECTING AND BYPASSING FAULTY SWITCHES IN A DIGITAL MATRIX SWITCH

[75] Inventors: Natarajan Kumar, Oakton; Richard L. Mannon, Woodbridge, both of Va.

[73] Assignee: Cornet, Inc., Springfield, Va.

[21] Appl. No.: 477,944

[22] Filed: Jun. 7, 1995

[51] Int. Cl.[6] .................................................. H04L 12/42
[52] U.S. Cl. ....................................................... 395/182.02
[58] Field of Search .............................. 395/182.02, 312, 395/182.01, 183.06, 183.13, 183.19; 370/13, 217, 241, 242, 244; 379/15, 17; 324/500; 340/825, 825.87, 826

[56] References Cited

U.S. PATENT DOCUMENTS

| | | | |
|---|---|---|---|
| Re. 34,528 | 2/1994 | Franaszek | 340/825 |
| 3,546,390 | 12/1970 | Hackenberg et al. | 179/18 |
| 4,229,624 | 10/1980 | Haben et al. | 179/18 E |
| 4,393,381 | 7/1983 | Seiden | 340/825 |
| 4,417,245 | 11/1983 | Melas et al. | 340/825 |
| 4,485,467 | 11/1984 | Miles et al. | 370/14 |
| 4,497,054 | 1/1985 | Read | 370/58 |
| 4,709,365 | 11/1987 | Beale et al. | 371/11 |
| 4,752,777 | 6/1988 | Franaszek | 340/825 |
| 4,901,309 | 2/1990 | Turner | 370/60 |
| 4,928,022 | 5/1990 | Marum | 307/241 |
| 4,935,737 | 6/1990 | Izbicki et al. | 340/825 |
| 4,964,105 | 10/1990 | Schrodt et al. | 370/16 |
| 4,970,505 | 11/1990 | Hirata et al. | 340/825 |
| 5,123,011 | 6/1992 | Hein et al. | 370/58.1 |
| 5,198,808 | 3/1993 | Kudo | 340/825 |
| 5,229,990 | 7/1993 | Teraslinna | 370/60 |
| 5,331,631 | 7/1994 | Teraslinna | 370/60 |
| 5,347,270 | 9/1994 | Matsuda et al. | 340/825 |
| 5,365,511 | 11/1994 | Kusano | 370/16 |

*Primary Examiner*—Robert W. Beausoliel, Jr.
*Assistant Examiner*—Stephen C. Elmore
*Attorney, Agent, or Firm*—Finnegan, Henderson, Farabow, Garrett & Dunner, L.L.P.

[57] ABSTRACT

In accordance with the present invention, defective switches of a switch array are first detected by a control and diagnostic processor by counting the transitions of actual data before and after it is transmitted through an individual switch. In addition, a generator supplies a binary test signal to idle switches, and the number of transitions of the test signal at the input of the switch is compared with the number of transitions at the switch output. If the number of transitions at the switch input and output are not the same, the switch is deemed defective, and an operator is informed of the defective switch identity. In addition, input lines to the defective switch are rerouted to a switch in a redundant or auxiliary switch array. Further, output lines coupled to the defective switch are replaced by the output lines of the redundant array.

14 Claims, 4 Drawing Sheets

APPARATUS AND METHOD FOR DETECTING AND BYPASSING FAULTY SWITCHES IN A DIGITAL MATRIX SWITCH

BACKGROUND OF THE INVENTION

The present invention is directed to a digital matrix switch. In particular, a fault tolerant digital matrix.

DESCRIPTION OF THE PRIOR ART

Computers or other data terminal equipment (DTEs) frequently communicate with each other via modems, multiplexers or other data circuit equipment (DCEs). Often, it is necessary for a particular DTE to couple to a selected DCE, or a group of DCES. Digital matrix or cross-point switches are generally used to facilitate such communication FIG. 1 is a schematic diagram of a conventional matrix switch 100, which can couple any one of n input lines 10 to any one of n output lines 20. In response to a control signal from terminal 40, control circuitry 30 routes a signal present on one of input lines 10 to a desired one of output lines 20 by closing an appropriate one of switches 50 in matrix 100.

In the example shown in FIG. 1, if it is desired to couple a DTE connected to input 10-1 to a DCE connected to output 20-3, an operator present at terminal 40 generates an appropriate control signal, which is received by control circuit 30. Control circuit 30, in turn, closes switch 52, coupling input 10-1 to output 20-3.

In a conventional PBX system, however, the operator and terminal 40 are eliminated and control circuitry 30 can select one of output lines 20 based on the input signal itself (e.g., based on a phone number).

Occasionally, one of the switches in matrix 50 fails. Once this happens, data cannot be transmitted through the failed switch. It is therefore necessary for the faulty switch to be identified and replaced. This results in significant down time, during which all DTEs and DCEs coupled to the matrix are unable to communicate with each other.

SUMMARY OF THE INVENTION

An object of the invention is to provide a digital matrix switch, which can isolate and identify faulty switches.

A further object of the present invention is to provide a digital matrix switch having a reduced down-time when one or more of its switches become defective.

A further object of the present invention is to provide a fault-tolerant matrix switch.

Additional objects and advantages of the invention will be set forth in part in the description which follows, and in part will be obvious from the following description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a digital matrix switch having a first input line, a first output line, and a first switch. The first input line and the first output line are selectively coupled to each other via the first switch, and the first input line carries a first signal and the first output line carries a second signal.

A second input line, a second output line, and a second switch are further provided. A first detector is coupled to the first input line, and a second detector is coupled to the first output line, which detect characteristics of the first and second signals, respectively. A processor is coupled to the first and second detectors and includes a comparator circuit, which compares the characteristics of the first and second signals.

When the characteristic of the first signal does not correspond to the characteristic of the second signal, the processor couples the first input line to the second input line, and selectively couples the second input line to the second output line via the second switch.

Further in accordance with the present invention, a method is provided for switching signals, comprising the steps of; supplying a first signal on a first input line; selectively coupling said first input line to a first output line via a switch; detecting a characteristic of said first signal and a characteristic of a second signal on said first output line; comparing said characteristic of said second signal on said first output line with a characteristic of said first signal on the first input line; and coupling said first input line to a second input line and selectively coupling said second input line to a second output line via a second switch when said characteristic of said first signal does not correspond to the characteristic of said second signal.

It is to be understood that both the foregoing general description and the following detailed description are exemplary and explanatory only and are not restrictive of the invention, as claimed.

The accompanying drawings, which are incorporated in and constitute a part of this specification, illustrate a preferred embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, defective switches of a switch array are detected by a control and diagnostic processor that counts the transitions of actual digital data before and after it is transmitted through an individual switch. Alternatively, a data generator supplies a binary signal through idle switches, and the number of transitions of the binary signal at the input of the switch is compared with the transitions at the switch output. If the number of transitions at the input and output are not the same, the switch is deemed defective, and an operator is informed of the faulty switch. In addition, an input line to the faulty switch identity is rerouted to a switch in a redundant or auxiliary switch array. Further, an output line coupled to the defective switch is replaced by an output line of the redundant or auxiliary switch array.

Figure 1:
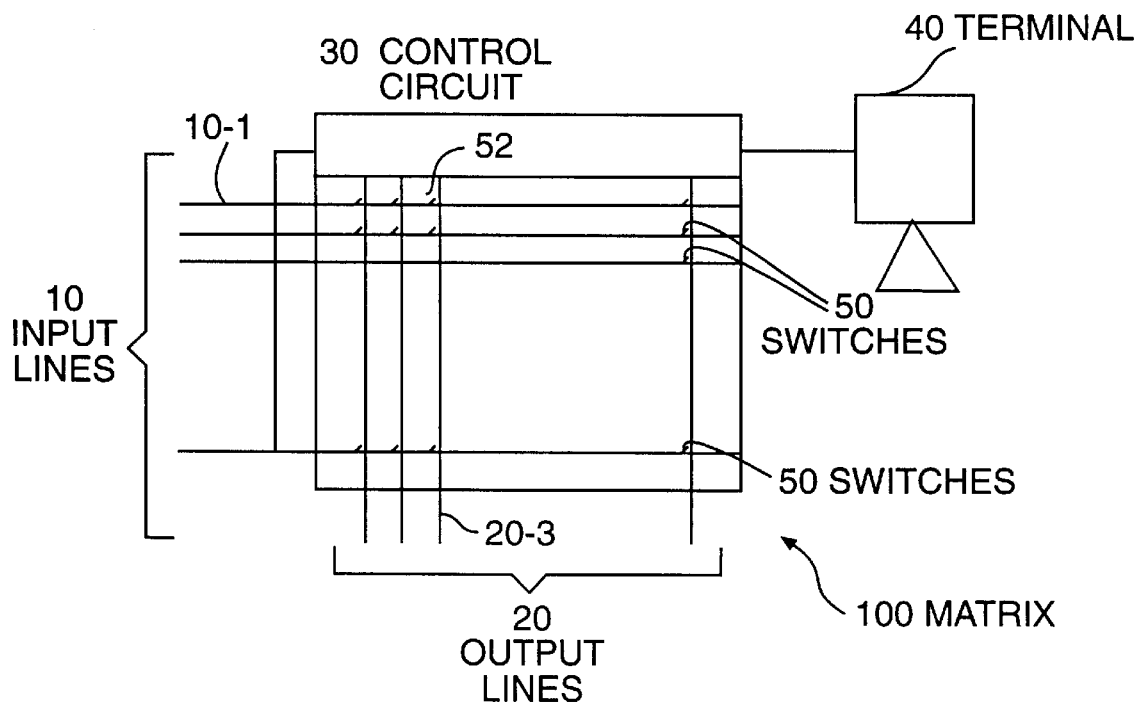
FIG. 1 is a schematic diagram of a conventional digital matrix switch.
Figure 2:
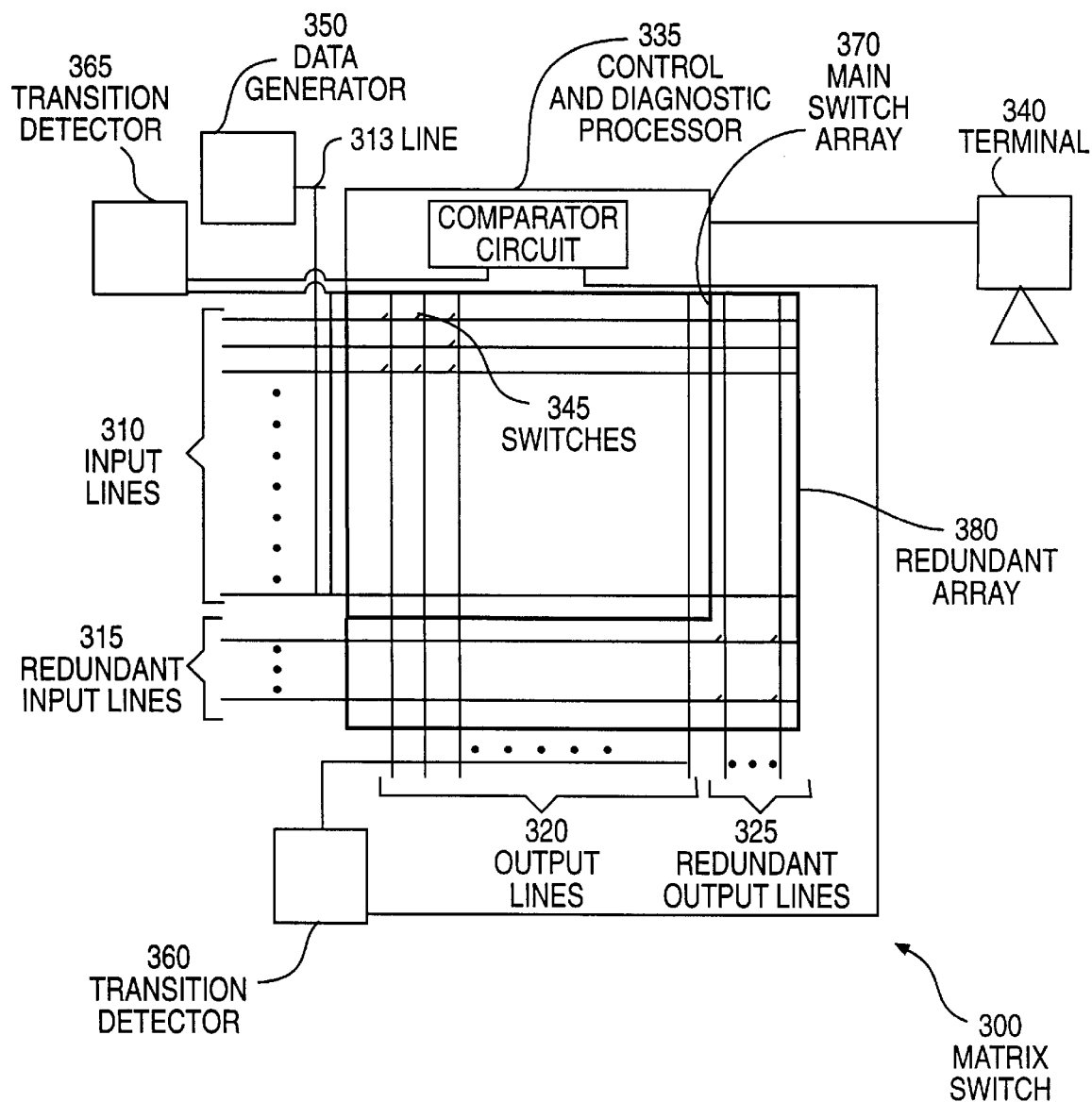
FIG. 2 is a schematic diagram of a digital matrix switch in accordance with the present invention.

FIG. 2 illustrates a schematic diagram of a matrix switch in accordance with the present invention. As seen in FIG. 2, a switch array in the form of a matrix switch 300 preferably includes a main switch array 370, which can switch between any one of input lines 310 and output lines 320. Preferably, each of input lines 310 and output lines 320 total 256 lines. Matrix switch 300 further preferably includes a redundant switch array 380 including additional 16 input lines 315 and 16 output lines 325. Thus, matrix switch 300 preferably has a total of 272 input lines and 272 output lines.

Switches or cross-points 345 are located at respective intersections of the input and output line to selectively couple each input line to any selected one of the output lines. Preferably, each of switches 345 includes CMOS circuitry.

As further shown in FIG. 2, matrix switch 300 further preferably includes control and diagnostic processor 335 connected to an operator terminal 340. Preferably, control and diagnostic processor 335 is an INTEL 286 embedded processor. Other processors having comparable computing power can also be used. Terminal 340 is preferably a personal computer or workstation device having an adequate built-in man-machine interface. For example, terminal 340 may include a INTEL 486 or PENTIUM PC with a WINDOWS interface.

As further shown in FIG. 2, control and diagnostic processor 335 is coupled to data generator 350 and transition detector 360, including a counter (not shown). Data generator 350, in turn, is coupled to each of input lines 310 to main switch array 370, while transition detector 360 is connected to each of output lines 320 of main switch array 370.

Under normal operating conditions, i.e., when no fault is present in main switch array 370, user operated terminal 340 outputs control signals to control and diagnostic processor 335 to selectively close various switches in array 370 to couple certain inputs to designated outputs.

Further, during normal operation, control and diagnostic processor 335 monitors binary data generated by DTEs and appearing on input lines 310. This input data is compared with the output data of matrix switch 300 for each of the switch-connected input-ouput lines. In particular, preferably a first transition detector 365 (including a counter (not shown)) counts the number of transitions (transitions from binary "1" to "0" in the received signal) occurring on one of input lines 310 during a period or "window" of 100 msec., while a second transition detector counts the number of transitions on a corresponding one of output lines 320 over the same window. Both transition detectors supply outputs to control and diagnostic processor 335 in accordance with the number of transitions detected. Control and diagnostic processor 335 includes a comparator circuit which compares the two outputs, and, if there is a match, the switch connecting the input and output lines is found to be operative.

If the numbers of signal transitions relating to the same input signal are not the same, however, then one of the switches 345 routing that signal Is defective. Control and diagnostic processor 335 will then notify the operator of which of the switches in main switch array 370 is defective by supplying this information to terminal 340 for display to the operator.

Preferably idle input and output lines, which are carrying data from DTES, are also monitored by control and diagnostic processor 335. In particular, data generator 350 applies a test signal in the form of a random series of binary data ("1"s and "0"s), by a line 313, to selected ones of the idle input lines 310. The number of transitions of this test signal is detected by or stored in control and diagnostic processor 335. Control and diagnostic processor 335 then closes a selected one of the idle switches 345 connected to the idle input line receiving the test signal, which, if not faulty, will route the test signal to the one of the output lines connected thereto. Then, by comparing the outputs of transition detectors 360 and 365, control and diagnostic processor 335 determines whether the number of transitions in the signal input to the matrix switch is the same as the number output from the matrix switch. If these numbers are not equal, then the switch is determined to be defective and the operator at terminal 340 is notified of the identity of the defective switch 345 in the main switch array 370. Preferably, this monitoring process is periodically repeated for each of the idle switches 345 in main array 370 during their idle periods.

In addition to informing the operator that a particular switch is defective, control and diagnostic processor 335 reroutes input line(s) coupled to the identified defective switch(es) through a switch(es) in redundant or auxiliary switch array 380.

An example of such rerouting will now be discussed with reference to FIG. 3. Suppose a switch 345-1 in main switch array 370 for coupling input line 310-1 to output line 320-1 is found to be defective. Control and diagnostic processor 335 will then map input line 310-1 to input line 315-257 of redundant switch array 360. Mapping, in this case, is performed by connecting input line 310-1 through a series of switches or cross points 362 to input line 315-257. Switches 362 connect input line 310-1 to every sixteenth input line, i.e., input line 310-17, input line 310-33 . . . input line 310-241. Once the signal on input lines 310-1 reaches input line 315-257 of the redundant array, it is then coupled to auxiliary output line 325-1 through an auxiliary switch 345-257 in redundant switch array 380. Accordingly, auxiliary output line 325-1, in effect, is substituted for output line 320-1 of the main switch array for those signals originating on input line 310-1, for example, and defective switch 345-1 is bypassed.

Thus, not only are signals on input line 310-1, intended for routing to output line 320-1, routed to auxiliary output line 325-1, but signals on input lines 310-17, 310-33, . . . 310-241, routed to auxiliary output line 325-1 as well. Accordingly, signals on input lines 310-17, for example, are also routed to auxiliary input line 257, through switch 345-257 in redundant switch array 380, and thence to auxiliary output line 325-1.

Further, input lines 310-2, 310-18, 310-34 . . . 310-243 are similarly mapped to auxiliary input line 315-258, and input lines 310-3 to 310-256 are mapped in a like manner in accordance with the following table:

TABLE 1

| Auxiliary Input Line | | Input Lines Of Main Array |
|---|---|---|
| 315-259 | = | 310-3, 310-19, 310-35 . . . 310-243 |
| 315-260 | = | 310-4, 310-20, 310-36 . . . 310-244 |
| 315-261 | = | 310-5, 310-21, 310-37 . . . 310-245 |
| . | | . |
| . | | . |
| . | | . |
| 315-272 | = | 310-6, 310-32, 310-48 . . . 310-256 |

Figure 3:
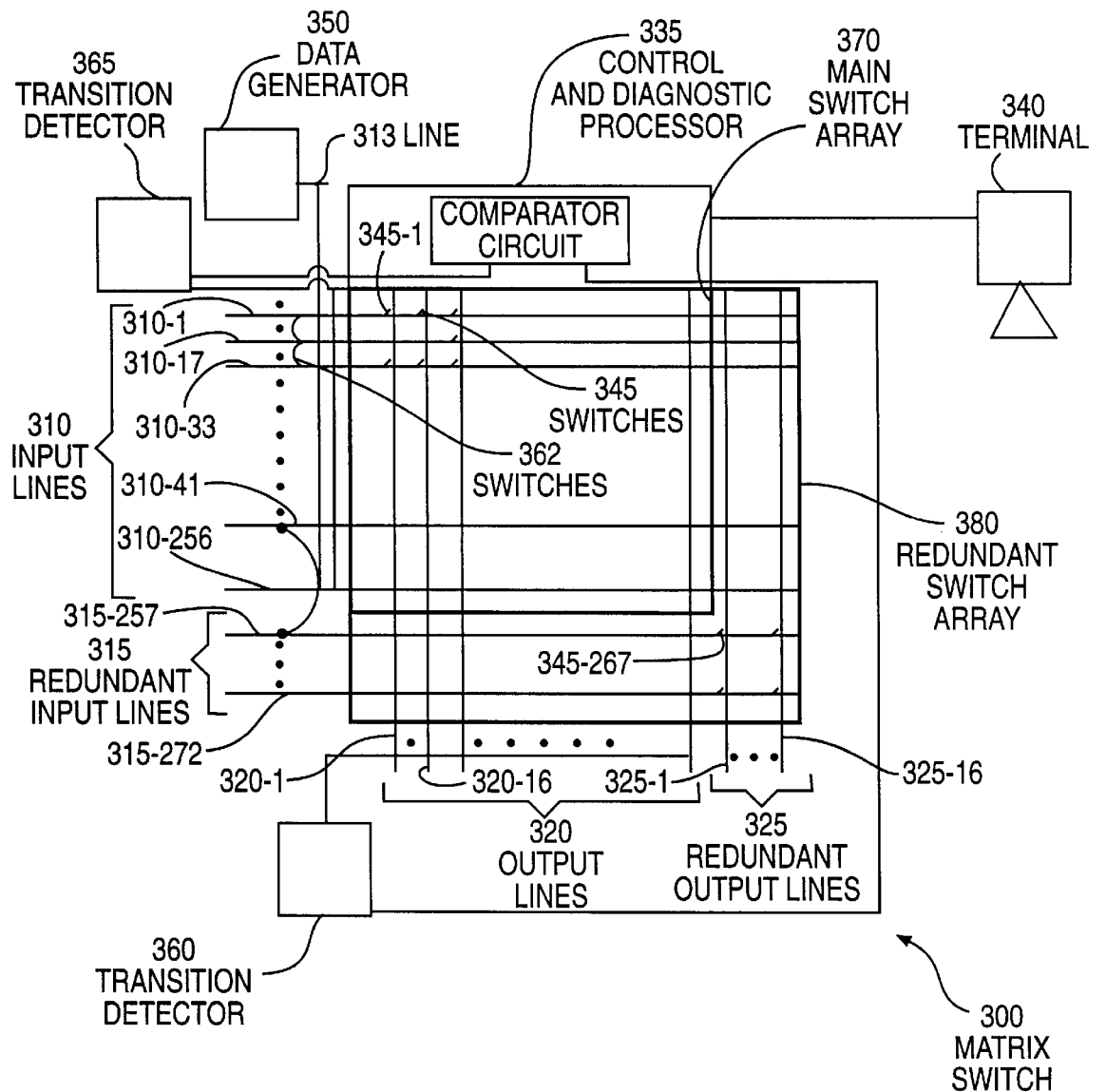
FIG. 3 is a schematic diagram of a digital matrix switch in accordance with the present invention wherein input lines are mapped to an auxiliary array of switches.

As further shown in FIG. 3, auxiliary input lines 315-257 to 315-272 may then be coupled to any one of auxiliary outputs 325-1 to 325-16, through respective switches 345 in redundant switch array 380. Accordingly, in addition to substituting output line 320-1 of main array with auxiliary output line 325-1, output lines 320-2 to 320-16 are also substituted by auxiliary output lines 325-2 to 325-16. As discussed below with reference to FIG. 4, this redundancy scheme facilitates easy repair of the matrix switch.

Figure 4:
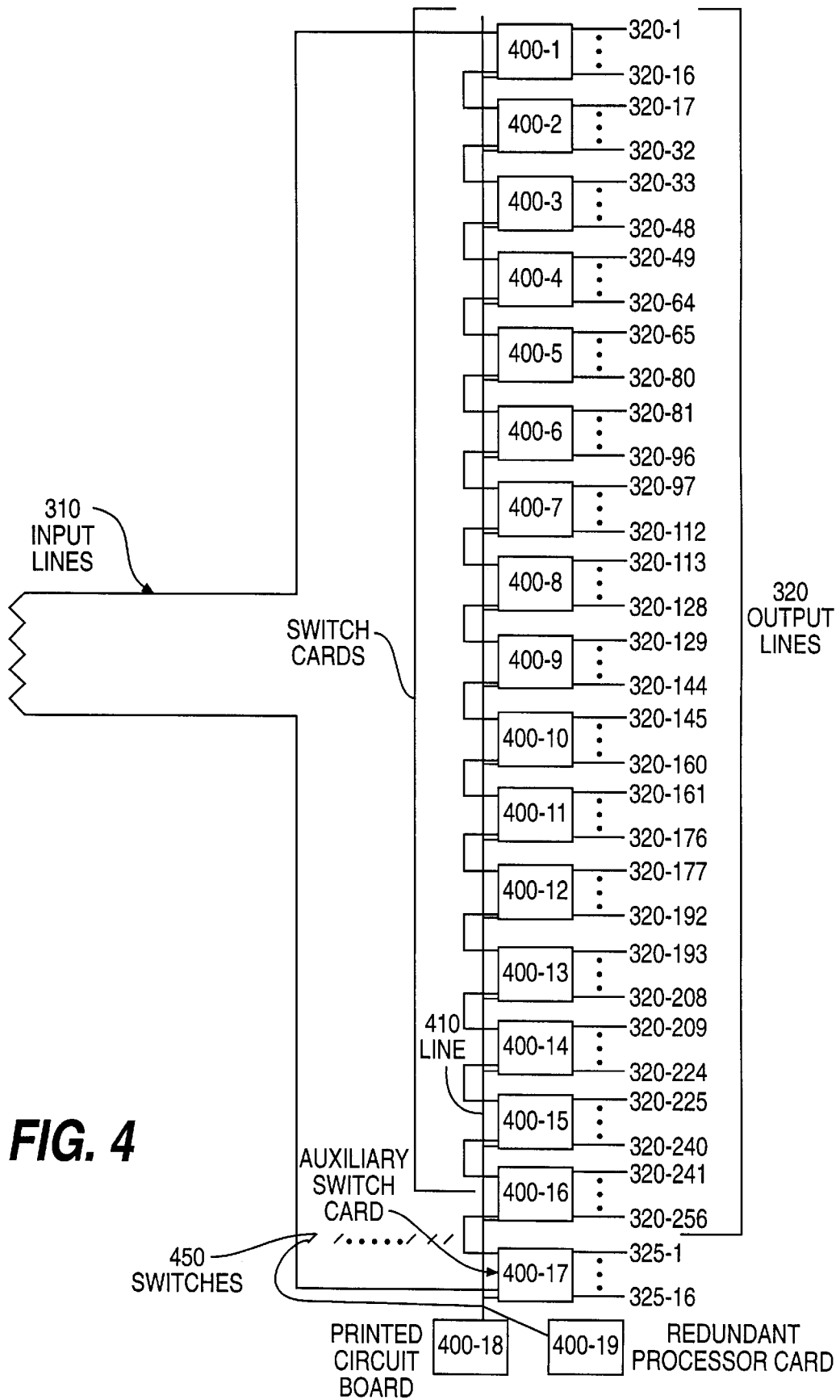
FIG. 4 is a schematic diagram of a digital matrix switch, implemented on printed circuit boards, in accordance with the present invention.

FIG. 4 illustrates an example of how the present invention is implemented on printed circuit boards. Preferably, matrix switch 300 includes 16 switch cards 400-1 to 400-16 and a spare or auxiliary switch card 400-17. Each switch card, including auxiliary switch card 400-17, has 256 inputs respectively corresponding to the 256 input lines 310, but only 16 outputs, corresponding to 16 of the 256 output lines 320. Thus, the 16 switch cards 400 provide a total of 256 outputs. In addition, each switch card preferably includes control logic and programmable array logic (not shown) to perform the actual switching in accordance with control signals generated by control and diagnostic processor 335. Further, each switch card preferably incudes transition detector and counter circuitry for determining whether a particular switch is defective.

Control and diagnostic processor 335 is preferably implemented on a separate printed circuit card 400-18. Further, it is preferable to include a redundant processor card 400-19 to insure proper operation in the event card 400-18 is defective.

During normal operation, each of switch cards 400-1 to 400-16 is connected to each of the 256 input lines 310. Then, in response to appropriate control signals output from control and diagnostic processor 335 along line 410, one of the switch cards 400-1 to 400-16 having an output connected to the output line designated by the terminal operator is activated so that an input signal on an input line is routed to the proper output line through a corresponding switch card.

Once a switch in one of switch cards 400-1 to 400-16 is found to be defective in the manner discussed above, however, the diagnostic and control processor 335 replaces the defective switch card with the auxiliary switch card. This substitution is performed by mapping each of the 256 input lines 310 from the defective switch card to the auxiliary 400-17, by closing, for example, switches 450. In addition, the 16 outputs of the defective switch card are replaced by the 16 outputs, 325-1 to 325-16, of the auxiliary card. The substitution is performed with minimal down-time (e.g., 100 milliseconds) without any downtime and without any inconvenience to the user.

The operator is informed of which switch card 400-1 to 400-16 is defective at terminal 340 and the defective switch card can then be readily replaced during periods of minimal activity.

Although the present invention has been described with reference to a digital switch which performs switching operations in response to outputs from an operator terminal, the present invention is not limited to such a system. Rather, the present invention is applicable to switching systems wherein processor circuitry is provided that couples data carrying input lines to appropriate output lines based on address information contained in the data itself.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A digital matrix switch, comprising:
   a first input line;
   a first output line;
   a first switch, said first input line and said first output line are selectively coupled to each other via said first switch, said first input line carrying a first signal and said first output line carrying a second signal;
   a second input line;
   a second output line;
   a second switch;
   a first detector coupled to said first input line, said first detector detecting a characteristic of said first signal;
   a second detector coupled to said first output line, said second detector detecting a characteristic of said second signal;
   a processor coupled to said first and second detectors and including a comparator circuit, said comparator circuit comparing said characteristic of said first signal with said characteristic of said second signal,
   wherein said processor couples said first input line to said second input line and selectively couples said second input line to said second output line via said second switch when said characteristic of said first signal does not correspond to said characteristic of said second signals.

2. A digital matrix switch in accordance with claim 1, wherein said detector includes a signal transition detector.

3. A digital matrix switch in accordance with claim 1, further comprising a data generator coupled to said first input line, said data generator supplying said first signal as a digital test signal to said first input line when said first input line is idle.

4. A digital matrix switch in accordance with claim 1, further comprising a terminal coupled to said processor, said terminal receiving signals from said processor identifying said first switch when said characteristic of said first signal does not correspond with said characteristic of said second signal.

5. A digital matrix switch in accordance with claim 4, wherein, in response to said signal received from said processor, said terminal displays to an operator identifying information corresponding to said first switch.

6. A digital matrix switch in accordance with claim 1, wherein said first and second signals are digital signals, said first detector counts a number of transitions in said first signal, and said second detector counts a number of transitions in said second signal, said comparator circuit compares said numbers of transitions in said first and second signals, said processor couples said first input line to said second input line and selectively couples said second input line to said second output line via said second switch when said numbers of transitions in said first and second signals are not the same.

7. A digital matrix switch in accordance with claim 1, wherein said first switch is one of a first plurality of switches, said plurality of switches constituting a first array of switches, and said second switch is one of a second plurality of switches, said second plurality of switches constituting a second array of switches.

8. A digital matrix switch, comprising:
   a first input line;
   a first output line;
   a first switch for selectively coupling said first input line to said first output line, said first input line carrying a first signal and said first output line carrying a second signal;
   a second input line;
   a second output line;

a second switch;

first detecting means coupled to said first input line for detecting a characteristic of said first signal;

second detecting means coupled to said first output line for detecting a characteristic of said second signal;

a processor coupled to said first and second detecting means including a comparing means, said comparing means for comparing said characteristic of said first signal with said characteristic of said second signal, wherein said processor couples said first input line to said second input line and selectively couples said second input line to said second output line via said second switch when said characteristic of said first signal does not correspond to said characteristic of said second signal.

9. A digital matrix switch in accordance with claim 8, further comprising generating means coupled to said first input line, said generating means supplying said first signal as a digital test signal to said first input line when said first input line is idle.

10. A digital matrix switch in accordance with claim 8, further comprising a terminal coupled to said processor, said terminal receiving signals from said processor identifying said first switch when said characteristic of said first signal does not correspond to said characteristic of said second signal.

11. A digital matrix switch in accordance with claim 10, wherein, in response to said signal received from said processor, said terminal displays to an operator identifying information corresponding to said first switch.

12. A digital matrix switch in accordance with claim 8, wherein said first and second signals are digital signals, and said first detecting means counts a number of transitions in said first signal, said comparing means for comparing the number of transitions in said first signal with a number of transitions in said second signal, and said processor couples said first input line to said second input line and selectively couples said second input line to said second output line via said second switch means when said number of transitions in said first signal is not the same as said number of transitions in said second signal.

13. A digital matrix switch comprising:

a plurality of switch cards, each receiving a first number of inputs and each having a second number of outputs, one of said switch cards coupling any one of said first number of inputs to any one of said second number of outputs; and an auxiliary switch card having said first number of inputs and said second number of outputs, wherein, when one of said plurality of switch cards is defective, said first number of inputs of said defective switch card are respectively routed to said first number of auxiliary switch card inputs, and said second number of outputs of said auxiliary switch card are substituted for said second number of outputs of said defective switch card.

14. A method for switching signals, comprising the steps of:

supplying a first signal on a first input line;

selectively coupling said first input line to a first output line via a switch;

detecting a characteristic of said first signal and a characteristic of a second signal on said first output line;

comparing said characteristic of said second signal on said first output line with said characteristic of said first signal;

coupling said first input line to a second input line and selectively coupling said second input line to a second output line via a second switch when said characteristic of said first signal does not correspond to the characteristic of said second signal.

* * * * *

UNITED STATES PATENT AND TRADEMARK OFFICE
CERTIFICATE OF CORRECTION

PATENT NO. : 5,809,221
DATED : September 15, 1998
INVENTORS : Natarajan KUMAR and Richard MANNON It is certified that error appears in the above-identified patent and that said Letters Patent is hereby corrected as shown below:

In Claim 12, Col. 8, line 2, after "switch", delete "means".

Signed and Sealed this

Twenty-sixth Day of January, 1999

Attest:

Attesting Officer

Acting Commissioner of Patents and Trademarks